United States Patent
Zhu (10) Patent No.: US 11,923,989 B2
(45) Date of Patent: Mar. 5, 2024

(54) UPLINK FEEDBACK METHOD AND APPARATUS, TERMINAL, BASE STATION AND STORAGE MEDIUM

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 530 days.

(21) Appl. No.: 17/267,211

(22) PCT Filed: Aug. 10, 2018

(86) PCT No.: PCT/CN2018/100037
§ 371 (c)(1),
(2) Date: Feb. 9, 2021

(87) PCT Pub. No.: WO2020/029268
PCT Pub. Date: Feb. 13, 2020

(65) Prior Publication Data
US 2021/0314108 A1    Oct. 7, 2021

(51) Int. Cl.
*H04L 1/18*    (2023.01)
*H04L 1/1867*    (2023.01)
*H04W 24/08*    (2009.01)
*H04W 72/0453*    (2023.01)
*H04W 72/1268*    (2023.01)
*H04W 72/23*    (2023.01)
*H04W 80/02*    (2009.01)

(52) U.S. Cl.
CPC ............ *H04L 1/1896* (2013.01); *H04W 24/08* (2013.01); *H04W 72/0453* (2013.01); *H04W 72/1268* (2013.01); *H04W 72/23* (2023.01); *H04W 80/02* (2013.01)

(58) Field of Classification Search
USPC .................... 370/329, 280, 366; 455/69, 509
See application file for complete search history.

(56) References Cited

U.S. PATENT DOCUMENTS

2016/0330630 A1*  11/2016  Yoo .................. H04L 1/0003
2021/0075558 A1*   3/2021  Takeda ............. H04W 72/23

FOREIGN PATENT DOCUMENTS

CN    107332646 A    11/2017
CN    108306716 A     7/2018
WO    WO 2017171299 A1    10/2017

OTHER PUBLICATIONS

Examination Report for Indian Application No. 202147009831, dated Feb. 1, 2022.
(Continued)

*Primary Examiner* — Kiet M Doan
(74) *Attorney, Agent, or Firm* — Finnegan, Henderson, Farabow, Garrett & Dunner, L.L.P (57) ABSTRACT

The present disclosure relates to an uplink feedback method and apparatus, a terminal, a base station and a storage medium. The method includes: monitoring downlink information transmitted by a base station; transmitting uplink feedback information during a configured time window as a feedback to the downlink information, wherein the time window comprises a plurality of transmission units, and the uplink feedback information is transmitted by the terminal on any of the transmission units in the time window.

14 Claims, 7 Drawing Sheets

(56) References Cited

OTHER PUBLICATIONS

Extended European Search Report for European Application No. 18929043.0, dated Feb. 25, 2022.
Written Opinion of the International Searching Authority in Application No. PCT/CN2018/100037, dated Apr. 30, 2019, 13 pages.

* cited by examiner

UPLINK FEEDBACK METHOD AND APPARATUS, TERMINAL, BASE STATION AND STORAGE MEDIUM

CROSS REFERENCE TO RELATED APPLICATIONS

This application is a national phase application based on International Application No. PCT/CN2018/100037, filed Aug. 10, 2018, the content of which is incorporated herein by reference.

TECHNICAL FIELD

The present disclosure relates to a field of communication technologies, and more particularly, to an uplink feedback method, an apparatus, a terminal, a base station and a storage medium.

BACKGROUND

Time-variant characteristics and multipath fading of wireless channels in a wireless communication system affect signal transmission, which may lead to the failure of data transmission. In order to solve this problem, mechanism of Hybrid Automatic Repeat Request (HARQ) is introduced in traditional wireless communication systems, that is, a sending side decides whether to retransmit a data packet that has been sent when a receiving side feedbacks information on whether the data is correctly received. For example, feedback ACKnowledgement (ACK) is used to indicate that the data is correctly received, and feedback Non-ACKnowledgement (NACK) information is used to indicate that the data is received incorrectly.

In a traditional Long Term Evolution (LTE) system, there is a timing relation between a time of data transmission on the sending side and the time of ACK/NACK feedback on the receiving side. In addition, due to processing capability of the terminal, in the LTE system, there is at least 4 ms between the time of data transmission and the time of ACK/NACK feedback. However, terminal processing capabilities are improved in a new generation of wireless cellular communication systems, and the above timing relation limits flexibility of data communication. Moreover, on an unlicensed spectrum, the communication system needs to compete for use of the channel, resulting in uncertainty of availability of the channel. The traditional method of fixing the HARQ feedback position cannot be applied to the communication system on the unlicensed spectrum.

SUMMARY

In a first aspect, the present disclosure provides an uplink feedback method applied to a terminal. The method includes: monitoring downlink information transmitted by a base station; and transmitting uplink feedback information during a configured time window, wherein the uplink feedback information is a feedback to the downlink information, the time window includes a plurality of transmission units, and the uplink feedback information is transmitted by the terminal on any of the transmission units within the time window.

In a second aspect, the present disclosure provides an uplink feedback method applied to a base station. The method includes: transmitting downlink information to a terminal; monitoring uplink feedback information transmitted by the terminal during a configured time window, wherein the uplink feedback information is a feedback to the downlink information, the time window includes a plurality of transmission units, and the uplink feedback information is transmitted by the terminal on any of the transmission units within the time window.

In a third aspect, the present disclosure provides a terminal. The terminal includes: a processor; and a memory storing instructions executable by the processor, wherein the processor is configured to monitor downlink information transmitted by a base station; and transmit uplink feedback information during a configured time window, wherein the uplink feedback information is a feedback to the downlink information, the time window includes a plurality of transmission units, and the uplink feedback information is transmitted by the terminal on any of the transmission units within the time window.

In a fourth aspect, the present disclosure provides a base station. The base station includes: a processor; and a memory storing instructions executable by the processor, wherein the processor is configured to transmit downlink information to a terminal; and monitor uplink feedback information transmitted by the terminal during a configured time window, wherein the uplink feedback information is a feedback to the downlink information, the time window includes a plurality of transmission units, and the uplink feedback information is transmitted by the terminal on any of the transmission units within the time window.

Through the above technical solutions, at least the following technical effects may be achieved. Based on the configured time window, the terminal flexibly selects the transmission unit used to send the uplink feedback information on the plurality of the transmission units within the time window. The configuration of the time window of the terminal may also be flexibly performed according to practical requirements, which overcomes limitations of the timing relation between the downlink information and the uplink feedback information as a feedback to the downlink information in the related art, and improves flexibility of data communication between the base station and the terminal. In addition, the technical solution according to the present disclosure is executed on the unlicensed spectrum, the communication system flexibly configures the time window of the terminal for sending the uplink feedback information to the time period when the terminal determines that the channel is available, thereby ensuring that the communication between the base station and the terminal is carried out normally when the time window has the right to use the channel, and improving versatility.

Additional features and advantages of the present disclosure will be described in detail in the following specific embodiments.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Firstly, the application scenarios of the embodiments of the present disclosure are described. The following embodiments of the present disclosure may be applied to wireless communication networks, for example, 5G New Radio (NR) system, LTE (Long Term Evolution) system, Long Term Evolution Advanced (LTE-A) system, and evolved networks thereof.

The wireless communication network includes base stations and terminal equipment. The base station may be a device that communicates with a terminal device or other communication sites such as a relay site. The base station may provide a communication coverage on a specific physical area. For example, the base station may be a gNB of a 5G NR system, an evolved node B (shorted for ENB or eNodeB) in the LTE system; or, other access network equipment that provide access services in the wireless communication network.

In the embodiments of the present disclosure, terminals may be distributed in a whole wireless communication network, and each terminal may be static or mobile. For example, the terminal may be a wireless communication device such as a cellular phone, a personal digital assistant (PDA), a handheld device and a laptop computer. The terminal may also be a Machine to Machine (M2M) terminal used in M2M communication, such as a device being capable of performing the M2M communication like a smart meter and a smart home appliance. In addition, it should be noted that with emergence of a new generation of augmented reality (AR) and virtual reality (VR) technologies, as well as new Internet applications such as vehicle-to-vehicle communication, deployment scenarios of wireless communication networks are increasing, and various types of terminals are developed, which is not limited in the present disclosure.

Based on the foregoing application scenarios, the uplink feedback method according to the embodiments of the present disclosure will be described below.

Figure 1:
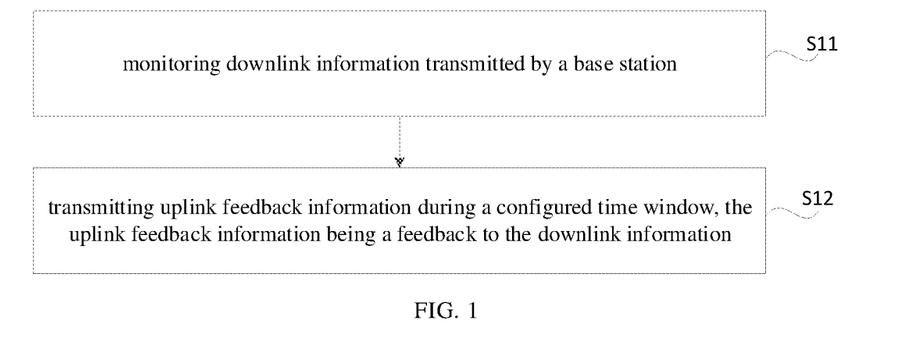
FIG. 1 is a flowchart illustrating an uplink feedback method according to an exemplary embodiment.

FIG. 1 is a flowchart illustrating an uplink feedback method according to an exemplary embodiment. The method is applied to a terminal. As illustrated in FIG. 1, the method may include the following.

At step S11, downlink information transmitted by a base station is monitored.

The downlink information may be downlink data, or may be downlink feedback information sent by the base station as a feedback to uplink data sent by the terminal to the base station, such as ACK or NACK information.

At step S12, uplink feedback information as a feedback to the downlink information is transmitted during a configured time window.

The time window includes multiple transmission units, and the uplink feedback information is transmitted by the terminal on any of the transmission units within the time window. The uplink feedback information may be ACK/NACK information of the downlink data sent for the base station and fed back by the terminal, or may be uplink data sent by the terminal after the base station feeds back the NACK information.

It is noted that the transmission unit may be a sub-frame, a symbol or a radio frame, which is not limited in the present disclosure. In detail, the time window refers to a time period configured by the terminal after the terminal receives the downlink information, and uplink feedback is performed on the downlink information during the time period. The time window may be pre-configured by the terminal based on the configuration information written in a protocol; or the time window may also be configured by the base station through a signaling. In this case, the base station may flexibly configure the time window of the terminal based on the actual situation. The terminal may accurately learn a position of the time window based on the configuration information of the time window. The unit of the time window may be an actual time unit such as milliseconds and seconds, or may be a logical time unit such as a transmission unit.

For example, the time window may be a time period from 0 millisecond to a fourth millisecond after the terminal receives the downlink information, or from a fourth millisecond and a sixth millisecond after the terminal receives the downlink information. For another example, the time window may include a first transmission unit to a fourth transmission unit after the terminal receives the downlink information, or a fourth transmission unit to a sixth transmission unit after the terminal receives the downlink information. In addition, for different downlink information sent by the base station at different times, the time windows configured by the terminal are variable. For example, for first downlink information sent by the base station, the terminal may send uplink feedback information as a feedback to the first downlink information during the time period from 0 millisecond to the fourth millisecond after receiving the first downlink information. For second downlink information sent by the base station, the terminal may send the uplink feedback information as a feedback to the second downlink information during the time period from the fourth millisecond to the sixth millisecond after receiving the second downlink information. The time window of the terminal may be specifically configured based on practical requirements.

With the above method, the terminal may flexibly select the transmission unit for sending the uplink feedback information from the multiple transmission units within the time window based on the configured time window, and the configuration of the time window may also be flexibly performed based on practical requirements, which overcomes limitations of the timing relation between the downlink information and the uplink feedback information as a feedback to the downlink information in the related art, thereby improving flexibility of data communication between the base station and the terminal. In addition, the technical solution according to the present disclosure is executed on the unlicensed spectrum, the communication system may flexibly configure the time window for sending, by the terminal, the uplink feedback information as the time period when the channel is available by the terminal, thereby ensuring that the communication between the base station and the terminal may be carried out normally and improving universality.

Figure 2:
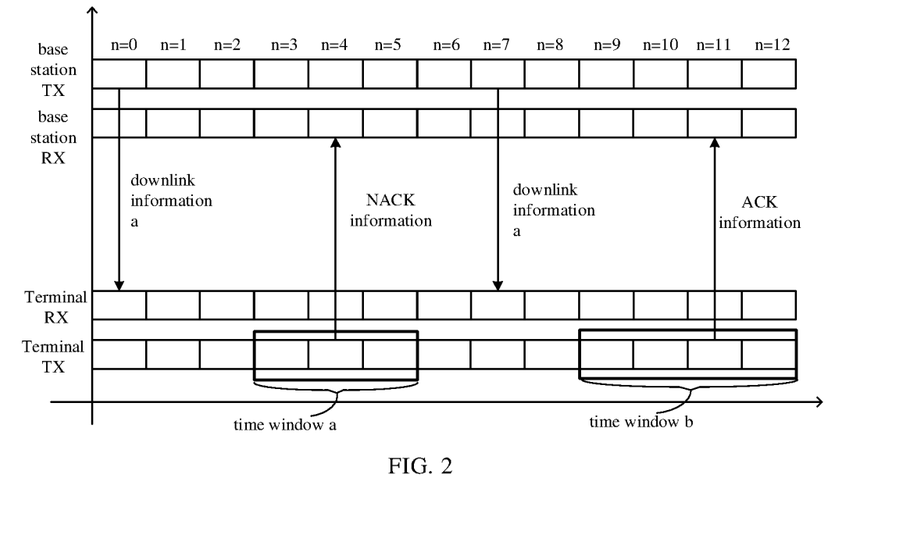
FIG. 2 is a schematic diagram illustrating a specific application of an uplink feedback method according to an exemplary embodiment.

As illustrated in FIG. 2, schematic description may be made on the method according to embodiments of the present disclosure when the downlink information is the downlink data sent by the base station to the terminal, and the uplink feedback information is the information sent by the terminal to indicate whether the terminal receives the downlink data correctly. As illustrated in FIG. 2, base station TX represents an interface through which the base station sends data, base station RX represents an interface through which the base station receives data, terminal TX represents an interface through which the terminal transmits data, and terminal RX represents an interface through which the terminal receives data. Moreover, each block illustrated in FIG. 2 represents a transmission unit, and n is a serial number of each transmission unit ranging from 0 to 12. As illustrated in FIG. 2, the base station transmits the downlink data a to the terminal on the transmission unit 0, and the terminal sends NACK information indicating that the downlink data a is incorrectly received in the transmission unit 4 within the time window a. In this way, based on the NACK information, the base station sends the downlink data a again to the terminal on the transmission unit 7, and the terminal sends the ACK information, indicating that the downlink data a is correctly received, to the base station on the transmission unit 11 within the time window b.

Figure 3:
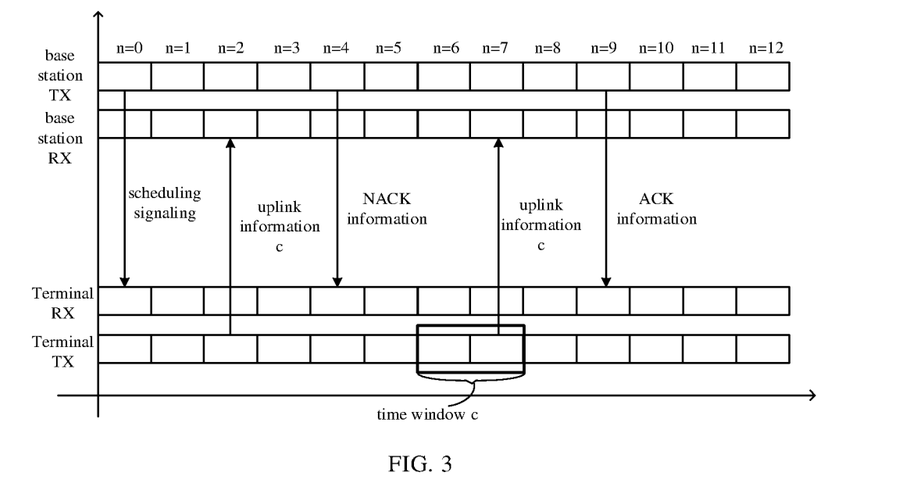
FIG. 3 is a schematic diagram illustrating another specific application of the uplink feedback method according to an exemplary embodiment.

As illustrated in FIG. 3, the downlink information is sent by the base station for indicating whether the base station correctly receives the uplink data sent by the terminal, and the uplink feedback information is the uplink data sent by the terminal based on the downlink information. In a case where the downlink information indicates that the base station has not received the uplink data correctly, the uplink feedback information is the uplink data that is not correctly received by the base station and re-transmitted by the terminal. In a case where the downlink information indicates that the base station has correctly received the uplink data sent by the terminal, the terminal may stop sending data, and may send new uplink data to the base station after receiving a new scheduling instruction sent by the base station. As illustrated in FIG. 3, the base station sends a scheduling signaling to the terminal in the transmission unit 0. The terminal sends the uplink data c to the base station on the transmission unit 2 based on the scheduling signaling. The base station sends, on the transmission unit 4, the NACK information indicating that the uplink data c is incorrectly received. After receiving the NACK information, the terminal re-transmits the uplink data c on the transmission unit 7 within the time window c. The base station transmits, in the transmission unit 9, the ACK information indicating that the uplink data c has been correctly received. After receiving the ACK information, the terminal confirms that the base station has correctly received the uplink data c, and waits for a next scheduling instruction. After receiving the next scheduling instruction sent by the base station, the terminal sends new uplink data to the base station.

FIGS. 2 and 3 are just examples to illustrate the implementation scenarios of the uplink feedback method according to the embodiments of the present disclosure. The time window may be flexibly configured and the transmission unit with the time window may be flexibly selected, which is described in detail below.

For the implementation in which the base station configures the time window of the terminal through a signaling, the embodiments of the present disclosure may further include: obtaining configuration information transmitted by the base station, and configuring the time window for transmitting the uplink feedback information by the terminal based on the configuration information. In detail, the terminal may obtain the configuration information explicitly provided in a radio resource control (RRC) signaling from the base station, the configuration information explicitly provided in a media access control (MAC) CE from the base station, or the configuration information explicitly provided in a physical layer signaling from the base station.

In other words, the base station may explicitly provide the configuration information for configuring the time window of the terminal in the RRC signaling, MAC CE, or physical layer signaling.

In addition, in a possible implementation of the embodiments of the present disclosure, the information for configuring the time window of the terminal may also be given in the protocol without being configured by the base station through the signaling.

In detail, in order to make the configuration of the time window flexible, the configuration information given by the base station in the signaling or in the protocol may be a configuration information set for configuring different time windows. That is, the configuration information set may be preset on the terminal through configuring the configuration information by the base station or directly providing the configuration information in the protocol, and the embodiments of the present disclosure may further include: receiving configuration indication information transmitted by the base station; and selecting configuration information from the configuration information set based on the configuration indication information to configure the time window for transmitting the uplink feedback information by the terminal. The configuration information set includes configuration information for configuring different time windows.

For example, Table 1 is the configuration information set of a terminal according to an exemplary embodiment of the present disclosure. As illustrated in Table 1, this set includes multiple configurations of different time windows.

TABLE

| Configuration number | Configuration information |
|---|---|
| 1 | 2 transmission units |
| 2 | 5 transmission units |
| 3 | 10 transmission units |
| 4 | 20 transmission units |

In Table 1, the configuration information corresponding to each configuration number indicates the number of transmission units (i.e., the uplink transmission units) for transmitting the uplink feedback information adjacent to the downlink transmission unit for transmitting the downlink information, after receiving the downlink information by the terminal.

In this way, the above configuration indication information may be a corresponding information field added by the base station in the scheduling signaling or an original information field. The above configuration indication information is used to indicate the configuration information of Table 1 for configuring the time window of the terminal to send the uplink feedback information as a feedback to the downlink information scheduled by the scheduling signaling. The information field has a fixed or configurable bit length and may be located in a fixed or configurable position of the scheduling signaling. That is, by adding an information field in the downlink scheduling instruction to indicate a cell of Table 1, the terminal may configure the time window with the configuration information corresponding to the cell based on the instruction. For example, if the cell indicated by the base station through the scheduling signaling is the cell with the configuration number 1, the base station may configure the time window to be two transmission units after receiving the downlink information. For example, the downlink information may be the downlink data sent by the base station to the terminal. In this case, the terminal may transmit the uplink feedback information to the base station on the two uplink transmission units (i.e., the configured time window) following the downlink transmission unit used to transmit the downlink data based on the scheduling signaling, and the uplink feedback information is used to indicate whether the terminal receives the downlink data correctly.

It is noted that Table 1 is only an example, in which the unit within the time window is indicated by a logical time unit (i.e., a transmission unit). Those skilled in the art should know that in some implementations, actual time unit may also be used to represent the time window, and the size of the time window may also be flexibly set based on practical requirements.

Figure 4:
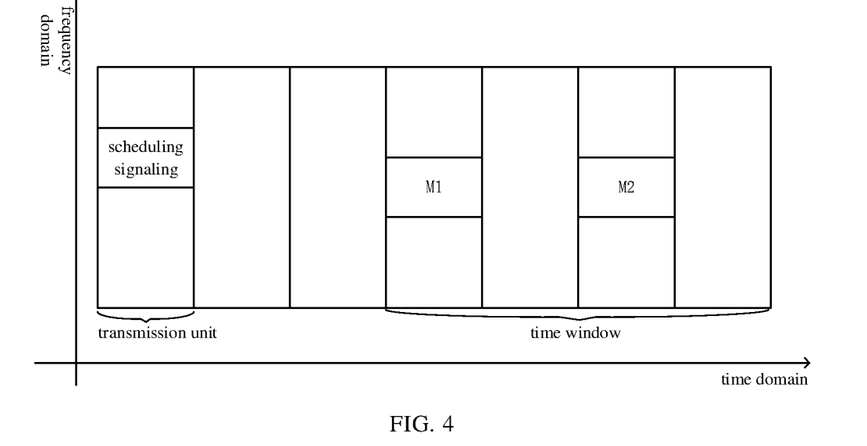
FIG. 4 is a schematic diagram illustrating a transmission unit for sending uplink feedback information within a selected time window according to an exemplary embodiment.

Further, within the time window that has been configured, the terminal may send the uplink feedback information on at least one fixed transmission unit within the time window. As illustrated in FIG. 4, the time window includes the third to sixth transmission units following the transmission unit for transmitting the scheduling signaling, and the first and third transmission units within the time window are fixed as transmission units for transmitting the uplink feedback information of the downlink information scheduled in response to the scheduling signaling. M1 and M2 respectively represent transmission positions of the first transmission unit and the third transmission unit within the time window for carrying the uplink feedback information.

Figure 5:
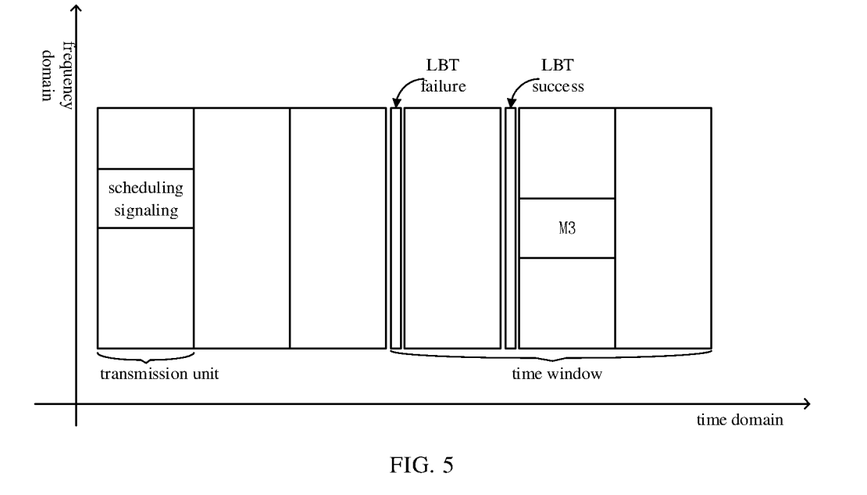
FIG. 5 is a schematic diagram illustrating another transmission unit for sending uplink feedback information within a selected time window according to an exemplary embodiment.

In some embodiments, the terminal may also transmit the uplink feedback information on the transmission unit, being selected based on a predetermined configuration, within the time window. For example, transmitting the uplink feedback information on the transmission unit, being selected based on the predetermined configuration, within the time window may include determining a first available transmission unit within the time window; and transmitting the uplink feedback information on the first available transmission unit. The first available transmission unit is an earliest available transmission unit. The terminal may determine the earliest available transmission unit within the time window based on the Listen Before Talk (LBT) mechanism. As illustrated in FIG. 5, the time window includes the third to fifth transmission units following the transmission unit of transmitting the scheduling signaling. In this time window, the terminal fails to transmit the uplink feedback information in the first transmission unit due to a failure of the LBT. The terminal continues to perform LBT detection. If LBT successes on the second transmission unit, it indicates that the second transmission unit is available. Therefore, the uplink feedback information may be sent at the M3 position of the second transmission unit.

In some embodiments, frequency domain positions used to carry the uplink feedback information on each transmission unit within the time window are the same, that is, the terminal may send the uplink feedback information, such as the ACK/NACK feedback information, at the fixed frequency domain position of the transmission units within the configured time window. In some embodiments, the frequency domain positions used to carry the uplink feedback information on each transmission unit within the time window are different. For example, in a possible implementation, the terminal may directly obtain the frequency positions of the transmission units for carrying the uplink feedback information based on the indication of the scheduling signaling, or the terminal may calculate the frequency positions of the transmission units for carrying the uplink feedback information based on a predefined rule through the time positions of the transmission units, which is not limited in the present disclosure.

In some embodiments, the terminal may transmit, during the time window, one or more pieces of uplink feedback information for a same piece of downlink information sent by the base station. In some embodiments, the terminal may also use different frequency domain resources of the transmission units within the time window to transmit the uplink feedback information for the same piece of downlink feedback information sent by the base station. In this way, the terminal may flexibly transmit the uplink feedback information to improve the reliability of data transmission.

With the above method, the time window of the terminal may be flexibly configured, the transmission unit within the time window for sending the uplink feedback information may be flexibly selected, and the frequency domain position of the transmission unit for carrying the uplink feedback information may be flexibly selected, thereby improving the flexibility of data communication between the base station and the terminal and allowing the HARQ technologies between the base station and the terminal to be applied to the unlicensed spectrum.

Figure 6:
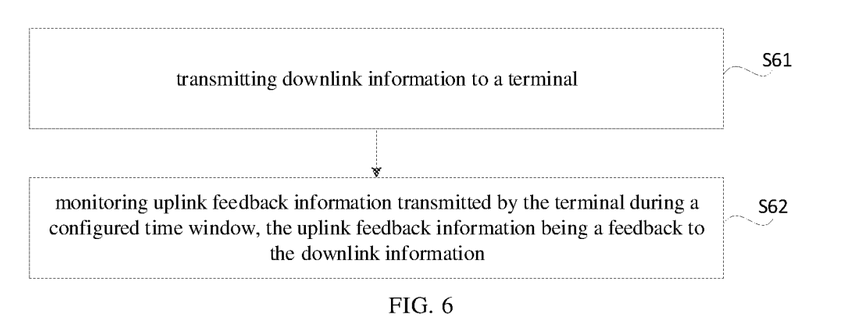
FIG. 6 is a flowchart illustrating another uplink feedback method according to an exemplary embodiment.

FIG. 6 is a flowchart illustrating another uplink feedback method according to an exemplary embodiment. The method is applicable to a base station. As illustrated in FIG. 6, the method may include the following.

At step S61, downlink information is transmitted to a terminal.

The downlink information may be downlink data, or downlink feedback information sent by the base station as a feedback to uplink data sent by the terminal to the base station, such as, ACK or NACK information.

At step S62, uplink feedback information transmitted by the terminal is monitored during a configured time window as a feedback to the downlink information.

The time window includes multiple transmission units, and the terminal sends the uplink feedback information on any transmission unit within the time window.

It is noted that the terminal may transmit the uplink feedback information on a fixed transmission unit within the time window, or flexibly select a transmission unit within the time window to transmit the uplink feedback information based on a predefined rule. Therefore, at step S62, monitoring the uplink feedback information transmitted by the terminal during the configured time window as a feedback to the downlink information includes: monitoring the uplink feedback information on a fixed transmission unit within the time window; or monitoring the uplink feedback information on each transmission unit within the time window.

With the above method, the base station may monitor, during a time window, the uplink feedback information transmitted on any one of transmission units within the time window selected by the terminal, which overcomes limitations of the timing relation between the downlink information and the uplink feedback information as a feedback to the downlink information in the related art, and improves flexibility of data communication between the base station and the terminal.

In a possible implementation, the time window for the base station to transmit the uplink feedback information may be configured by the base station for the terminal through signaling, and the method further includes: transmitting configuration information for configuring, by the terminal, the time window for transmitting the uplink feedback information to the terminal.

In detail, transmitting the configuration information to the terminal includes: explicitly providing the configuration information in a radio resource control (RRC) signaling; or explicitly providing the configuration information in a media access control (MAC) CE; or explicitly providing the configuration information in a physical layer signaling.

In some embodiments, the method further includes: transmitting configuration indication information to the terminal, in which the configuration indication information is configured for selecting, by the terminal, configuration information from a configuration information set to configure the time window for transmitting the uplink feedback information, and the configuration information set includes configuration information for configuring different time windows.

In detail, the terminal is provided with the configuration information set in advance. The configuration information set may be given by the base station through signaling, or may be given in a protocol. The configuration information set may refer to Table 1. The base station may add the corresponding information field in the scheduling signaling or replaces the original information field as the configuration indication information, which is used to indicate the configuration information of the Table 1, for configuring the time window of the terminal to transmit the uplink feedback information as a feedback to the downlink information scheduled by the scheduling signaling. The information field has a fixed or configurable bit length, and may be located in a fixed or configurable position of the downlink scheduling signaling. Details may be referred to the related descriptions of Table 1, which will not be repeated here.

Figure 7:
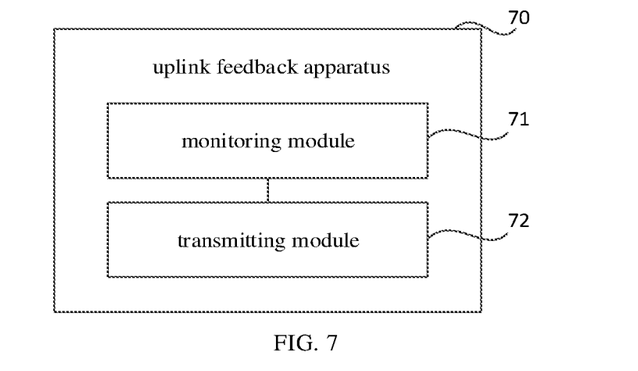
FIG. 7 is a block diagram illustrating an uplink feedback apparatus of an application terminal according to an exemplary embodiment.

FIG. 7 is a block diagram of an uplink feedback apparatus 70 of an application terminal according to an exemplary embodiment. The apparatus is applicable to a terminal. As illustrated in FIG. 7, the apparatus 70 includes: a monitoring module 71 and a transmitting module 72. The monitoring module 71 is configured to monitor downlink information transmitted by a base station. The transmitting module 72 is configured to transmit uplink feedback information during a configured time window, in which the uplink feedback information is a feedback to the downlink information, the time window includes a plurality of transmission units, and the uplink feedback information is transmitted by the terminal on any of the transmission units within the time window.

Figure 8:
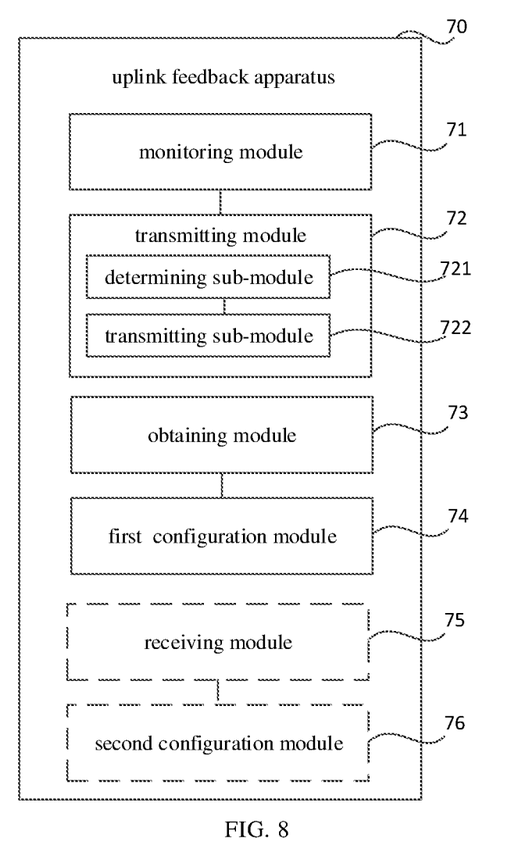
FIG. 8 is a block diagram illustrating another uplink feedback apparatus applied to a terminal according to an exemplary embodiment.

In some embodiments, the time window is pre-configured by the terminal based on configuration information written into a protocol; or the time window is configured by the base station through a signaling. As illustrated in FIG. 8, the apparatus 70 further includes: an obtaining module 73 configured to obtain configuration information transmitted by the base station, and a first configuration module 74 configured to configure the time window for transmitting the uplink feedback information by the terminal based on the configuration information.

Optionally, the obtaining module 73 is configured to: obtain the configuration information explicitly provided in a radio resource control (RRC) signaling from the base station; or, obtain the configuration information explicitly provided in a media access control (MAC) CE from the base station; or, obtain the configuration information explicitly provided in a physical layer signaling from the base station.

In another possible implementation, the terminal is provided with a configuration information set in advance, as illustrated in FIG. 8, the apparatus 70 further includes: a receiving module 75 and a second configuration module 76. The receiving module 75 is configured to receive configuration indication information transmitted by the base station. The second configuration module 76 is configured to select configuration information from the configuration information set based on the configuration indication information to configure the time window for transmitting the uplink feedback information by the terminal, in which the configuration information set includes configuration information for configuring different time windows. It is noted that the receiving module 75 and the second configuration module 76 are denoted as dashed-line boxes, and the obtaining module 73 and the first configuration module 74 are denoted as solid-line boxes, dashed-line boxes and solid-line boxes correspond to the two implementations of the terminal configuring the time window respectively. In the specific implementation, one mode may be chosen for implementation.

For the specific implementation, please refer to the detailed description of Table 1, which will not be repeated here.

Optionally, the transmitting module 72 is configured to: transmit the uplink feedback information on at least one fixed transmission unit within the time window; or, transmit the uplink feedback information on a transmission unit, being selected based on a predetermined configuration, within the time window.

For the predetermined configuration for selecting the transmission unit, reference may be made to the above description of FIG. 5, which will not be repeated here.

Optionally, as illustrated in FIG. 8, the transmitting module 72 includes: a determining sub-module 721 and a transmitting sub-module 722. The determining sub-module 721 is configured to determine a first available transmission unit within the time window. The transmitting sub-module 722 is configured to transmit the uplink feedback information on the first available transmission unit.

Optionally, frequency domain positions of the transmission units within the time window for carrying the uplink feedback information are same; or, frequency domain positions of the transmission units for carrying the uplink feedback information are different.

Optionally, the transmitting module 72 is configured to: transmit, during the time window, one or more pieces of uplink feedback information for a same piece of downlink information sent by the base station; or, transmit the uplink feedback information for a same piece of downlink information sent by the base station through different frequency domain resources of the transmission units within the time window.

With the above apparatus, the terminal flexibly selects the transmission unit for transmitting the uplink feedback information on the transmission units within the time window, and the configuration of the time window is flexibly performed according to practical requirements, which overcomes limitations of the timing relation between the downlink information and the uplink feedback information as a feedback to the downlink information in the related art, and improves flexibility of data communication between the base station and the terminal. In addition, the technical solution according to the present disclosure is executed on the unlicensed spectrum, the communication system flexibly configures the time window of the terminal for sending the uplink feedback information as the time period when the terminal determines that the channel is available, thereby ensuring that the communication between the base station and the terminal is carried out normally when the time window has the right to use the channel, and improving versatility.

Regarding the apparatus in the foregoing embodiments, the specific manner in which each module performs operation has been described in detail in the method embodiments, and detailed description will not be given here.

Figure 9:
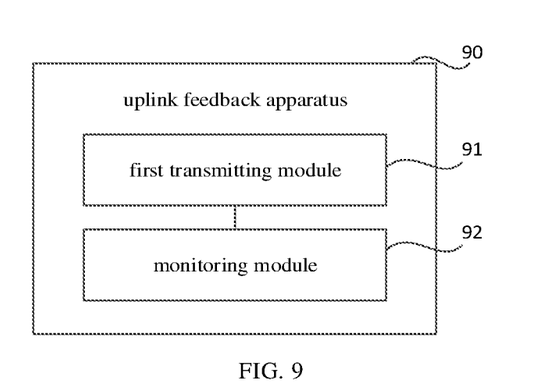
FIG. 9 is a block diagram illustrating an uplink feedback apparatus applied to a base station according to an exemplary embodiment.

FIG. 9 is a block diagram of an uplink feedback apparatus applied to a base station according to an exemplary embodiment. The apparatus is applicable to a base station. As illustrated in FIG. 9, the apparatus 90 includes: a first transmitting module 91 and a monitoring module 92. The first transmitting module 91 is configured to transmit downlink information to a terminal. The monitoring module 92 is configured to monitor uplink feedback information transmitted by the terminal during a configured time window as a feedback to the downlink information, in which the time window includes a plurality of transmission units, and the uplink feedback information is transmitted by the terminal on any of the transmission units within the time window.

Figure 10:
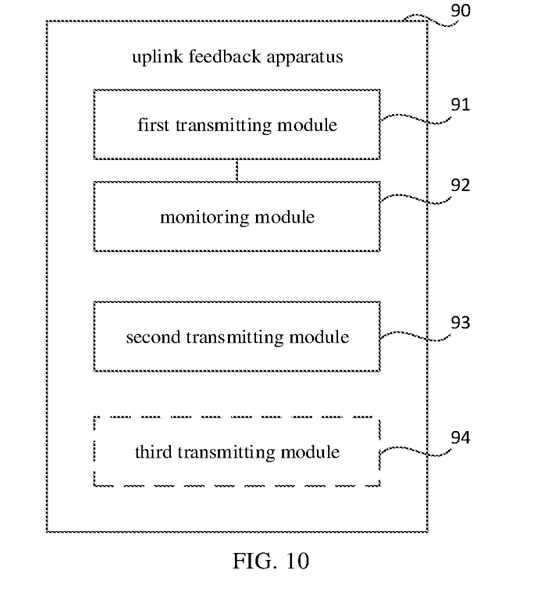
FIG. 10 is a block diagram illustrating another uplink feedback apparatus applied to a base station according to an exemplary embodiment.

Optionally, the time window is configured by the base station for the terminal through signaling. As illustrated in FIG. 10, the apparatus 90 further includes: a second transmitting module 93, configured to transmit configuration information for configuring, by the terminal, the time window for transmitting the uplink feedback information to the terminal.

Optionally, the second transmitting module 93 is configured to: explicitly provide the configuration information in a radio resource control (RRC) signaling; or explicitly provide the configuration information in a media access control (MAC) CE; or explicitly provide the configuration information in a physical layer signaling.

Optionally, as illustrated in FIG. 10, the apparatus 90 further includes: a third transmitting module 94, configured to transmit configuration indication information to the terminal, in which the configuration indication information is configured for selecting, by the terminal, configuration information from a configuration information set to configure the time window for transmitting the uplink feedback information, and the configuration information set includes configuration information for configuring different time windows. The third transmitting module 94 is a dashed-line box, and the second transmitting module 93 is a solid-line box, the dashed-line box and the solid-line box correspond to the two implementations of the terminal configuring the time window respectively. In the specific implementation, one mode may be chosen for implementation.

Optionally, the monitoring module 92 is configured to: monitor the uplink feedback information on a fixed transmission unit within the time window; or monitor the uplink feedback information on each transmission unit within the time window.

With the above apparatus, the base station monitors the uplink feedback information transmitted by any transmission unit within the time window selected by the terminal during a time window, which overcomes limitations of the timing relation between the downlink information and the uplink feedback information as a feedback to the downlink information in the related art, and improves flexibility of data communication between the base station and the terminal.

Regarding the apparatus in the foregoing embodiments, the specific manner in which each module performs operation has been described in detail in the method embodiments, and detailed description will not be given here.

The present disclosure also provides a computer-readable storage medium on which computer program instructions are stored, and when the program instructions are executed by a processor, the steps of the uplink feedback method executed on the terminal side according to the present disclosure are realized.

Figure 11:
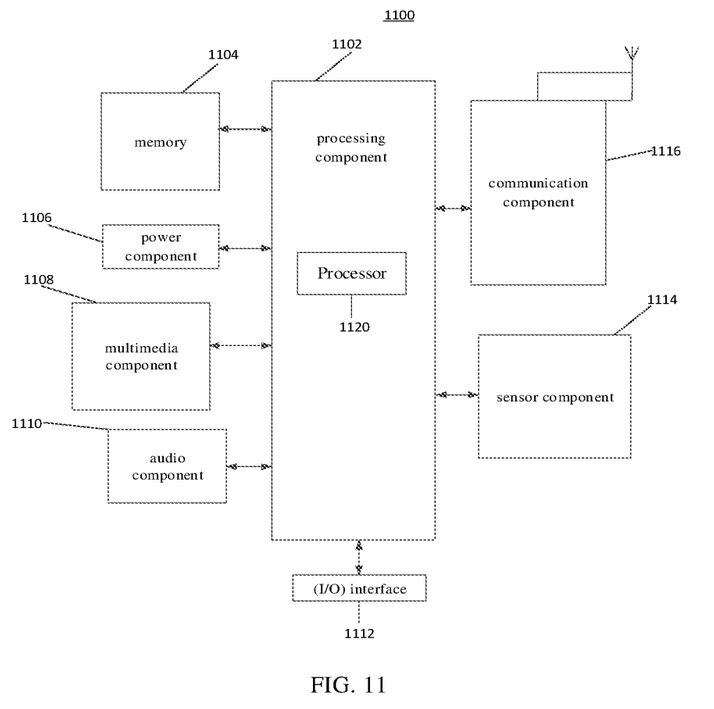
FIG. 11 is a block diagram illustrating a terminal according to an exemplary embodiment.

FIG. 11 is a block diagram of a terminal according to an exemplary embodiment. For example, the terminal 1100 may be user equipment, such as a mobile phone, a computer, a digital broadcasting terminal, a message receiving and sending device, a game console, a tablet device, a medical device, a fitness device, a personal digital assistant, etc.

As illustrated in FIG. 11, the terminal 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the terminal 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the terminal 1100. Examples of such data include instructions for any applications or methods operated on the terminal 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the terminal 1100. The power component 1106 may include a power management system, one or more power sources, and any other components associated with the generation, management, and distribution of power in the terminal 1100.

The multimedia component 1108 includes a screen providing an output interface between the terminal 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. When the terminal 1100 is in an operation mode, such as in a shooting mode or a video mode, the front camera and/or the rear camera receives external multimedia data. Each front camera and rear camera can be a fixed optical lens system or have focal length and optical zoom capabilities.

The audio component 1110 is configured to output and/or input audio signals. For example, the audio component 1110 includes a microphone ("MIC") configured to receive an external audio signal when the terminal 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the terminal 1100. For instance, the sensor component 1114 may detect an open/closed status of the terminal 1100, relative positioning of components, e.g., the display and the keypad, of the terminal 1100, a change in position of the terminal 1100 or a component of the terminal 1100, a presence or absence of user contact with the terminal 1100, an orientation or an acceleration/deceleration of the terminal 1100, and a change in temperature of the terminal 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the terminal 1100 and other devices. The terminal 1100 can access a wireless network based on a communication standard, such as WiFi, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1104, executable by the processor 1120 in the terminal 1100, for performing the above-described methods. For example, the non-transitory computer-readable storage medium may be a ROM, a RAM, a CD-ROM, a magnetic tape, a floppy disc, an optical data storage device, and the like.

Figure 12:
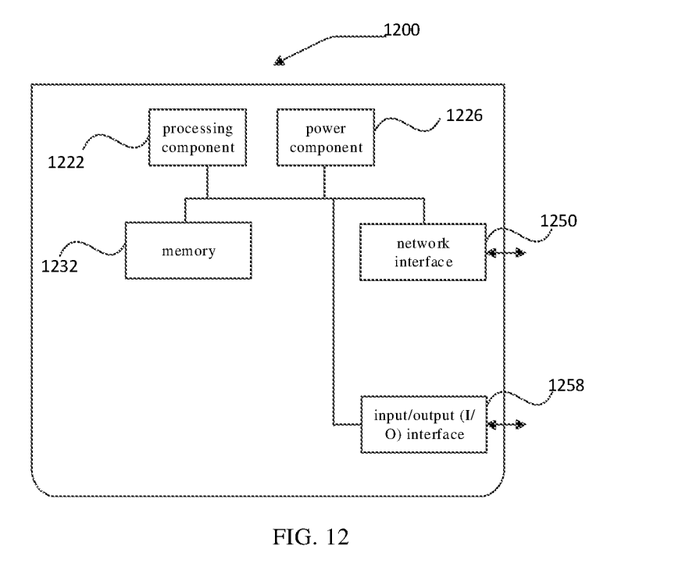
FIG. 12 is a block diagram illustrating a base station according to an exemplary embodiment.

FIG. 12 is a block diagram of a base station according to an exemplary embodiment. As illustrated in FIG. 12, the base station 1200 includes a processing component 1222, which further includes one or more processors, and a memory resource represented by a memory 1232 for storing instructions executable by the processing component 1222, such as application programs. The application program stored in the memory 1232 may include one or more modules each corresponding to a set of instructions. In addition, the processing component 1222 is configured to execute instructions to perform the above method.

The base station 1200 may further include a power supply component 1226 configured to perform power management of the base station 1200, a wired or wireless network interface 1250 configured to connect the base station 1200 to the network, and an input and output (I/O) interface 1258. The base station 1200 may operate based on an operating system stored in the memory 1232, such as Windows Server™, Mac OS X™, Unix™, Linux™, FreeBSD™ or the like.

The present disclosure also provides a computer-readable storage medium on which computer program instructions are stored, and when the program instructions are executed by a processor, the steps of the uplink feedback method executed on the terminal side according to the present disclosure are realized.

Those skilled in the art easily think of other embodiments of the present disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are indicated by the claims.

It should be understood that the present disclosure is not limited to the precise structure that has been described above and shown in the drawings, and various modifications and changes can be made without departing from the scope thereof. The scope of the present disclosure is limited only by the appended claims.

The preferred embodiments of the present disclosure are described in detail above with reference to the accompanying drawings. However, the present disclosure is not limited to the specific details in the above-mentioned embodiments.

Within the scope of the technical concept of the present disclosure, various simple modifications can be made to the technical solution of the present disclosure. These simple modifications all belong to the protection scope of the present disclosure.

It should be noted that the various specific technical features described in the above-mentioned specific embodiments can be combined in any suitable manner without contradiction. In order to avoid unnecessary repetition, the present disclosure will not further explain various possible combinations In addition, different embodiments of the present disclosure can also be combined arbitrarily and should also be regarded as the content disclosed in the present disclosure, without departing from the idea of the present disclosure.

What is claimed is:

1. An uplink feedback method, applied to a terminal, the method comprising:
   monitoring downlink information transmitted by a base station; and
   transmitting uplink feedback information during a configured time window, wherein the uplink feedback information is a feedback to the downlink information, the time window comprises a plurality of transmission units, and the uplink feedback information is transmitted by the terminal on any of the transmission units within the time window;
   wherein the terminal is provided with a configuration information set in advance, and the method further comprises:
   receiving configuration indication information transmitted by the base station; and
   selecting configuration information from the configuration information set based on the configuration indication information to configure the time window for transmitting the uplink feedback information by the terminal, wherein the configuration information set comprises configuration information for configuring different time windows;
   wherein transmitting the uplink feedback information during the configured time window comprises one of:
   transmitting the uplink feedback information on at least one fixed transmission unit within the time window; or
   transmitting the uplink feedback information on a transmission unit selected within the time window based on a predetermined configuration.

2. The method according to claim 1, wherein:
   the time window is pre-configured by the terminal based on configuration information in a protocol used between the terminal and the base station; or
   the time window is configured by the terminal based on a signaling received from the base station, and when the time window is configured by the terminal, the method further comprises:
   obtaining configuration information transmitted by the base station through the signaling, and configuring the time window for transmitting the uplink feedback information by the terminal based on the configuration information.

3. The method according to claim 2, wherein obtaining the configuration information transmitted by the base station comprises one of:
   obtaining the configuration information explicitly provided in a radio resource control (RRC) signaling from the base station;
   obtaining the configuration information explicitly provided in a media access control (MAC) control element (CE) from the base station; or
   obtaining the configuration information explicitly provided in a physical layer signaling from the base station.

4. The method according to claim 1, wherein transmitting the uplink feedback information on the transmission unit selected within the time window based on the predetermined configuration, comprises:
   determining a first available transmission unit within the time window; and
   transmitting the uplink feedback information on the first available transmission unit.

5. The method according to claim 1, wherein frequency domain positions of the transmission units within the time window for carrying the uplink feedback information are same or different.

6. The method according to claim 1, wherein transmitting the uplink feedback information during the configured time window comprises one of:
   transmitting, during the time window, one or more pieces of uplink feedback information for a same piece of downlink information sent by the base station; or
   transmitting the uplink feedback information for a same piece of downlink information sent by the base station through different frequency domain resources of the transmission units within the time window.

7. An uplink feedback method, applied to a base station, the method comprising:
   transmitting downlink information to a terminal; and
   monitoring uplink feedback information transmitted by the terminal during a configured time window, wherein the uplink feedback information is a feedback to the downlink information, the time window comprises a plurality of transmission units, and the uplink feedback information is transmitted by the terminal on any of the transmission units within the time window;
   wherein the method further comprises: transmitting configuration indication information to the terminal, wherein the configuration indication information is configured for selecting, by the terminal, configuration information from a configuration information set to configure the time window for transmitting the uplink feedback information, wherein the configuration information set comprises configuration information for configuring different time windows;
   wherein monitoring the uplink feedback information transmitted by the terminal during the configured time window comprises one of:
   monitoring the uplink feedback information on a fixed transmission unit within the time window; or
   monitoring the uplink feedback information on each transmission unit within the time window.

8. The method according to claim 7, further comprising:
   transmitting configuration information for configuring, by the terminal, the time window for transmitting the uplink feedback information to the terminal.

9. The method according to claim 8, wherein the transmitting the configuration information to the terminal comprises one of:
   explicitly providing the configuration information in a radio resource control (RRC) signaling;
   explicitly providing the configuration information in a media access control (MAC) control element (CE); or
   explicitly providing the configuration information in a physical layer signaling.

10. A terminal, comprising:
a processor; and
a memory storing instructions executable by the processor;
wherein the processor is configured to:
monitor downlink information transmitted by a base station; and
transmit uplink feedback information during a configured time window, wherein the uplink feedback information is a feedback to the downlink information, the time window comprises a plurality of transmission units, and the uplink feedback information is transmitted by the terminal on any of the transmission units within the time window;
wherein the terminal is provided with a configuration information set in advance, and the processor is further configured to:
receive configuration indication information transmitted by the base station; and
select configuration information from the configuration information set based on the configuration indication information to configure the time window for transmitting the uplink feedback information by the terminal, wherein the configuration information set comprises configuration information for configuring different time windows;
wherein in transmitting the uplink feedback information during the configured time window, the processor is further configured to perform one of:
transmitting the uplink feedback information on at least one fixed transmission unit within the time window; or
transmitting the uplink feedback information on a transmission unit selected within the time window based on a predetermined configuration.

11. The terminal according to claim 10, wherein:
the time window is pre-configured by the terminal based on configuration information in a protocol used between the terminal and the base station; or
the time window is configured by the terminal based on a signaling received from the base station, and the processor is further configured to:
obtain configuration information transmitted by the base station through the signaling, and
configure the time window for transmitting the uplink feedback information by the terminal based on the configuration information.

12. The terminal according to claim 11, wherein in obtaining the configuration information transmitted by the base station, the processor is further configured to perform one of:
obtaining the configuration information explicitly provided in a radio resource control (RRC) signaling from the base station;
obtaining the configuration information explicitly provided in a media access control (MAC) control element (CE) from the base station; or
obtaining the configuration information explicitly provided in a physical layer signaling from the base station.

13. The terminal according to claim 10, wherein in transmitting the uplink feedback information on the transmission unit selected within the time window based on the predetermined configuration, the processor is further configured to:
determine a first available transmission unit within the time window; and
transmit the uplink feedback information on the first available transmission unit.

14. The terminal according to claim 10, wherein frequency domain positions of the transmission units within the time window for carrying the uplink feedback information are same or different.

* * * * *